(12) United States Patent
Schumann

(10) Patent No.: US 6,179,097 B1
(45) Date of Patent: Jan. 30, 2001

(54) BRAKING DEVICE FOR VEHICLES

(75) Inventor: Frank Schumann, Boennigheim (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/155,347

(22) PCT Filed: Jan. 17, 1997

(86) PCT No.: PCT/DE97/00080
§ 371 Date: Sep. 28, 1998
§ 102(e) Date: Sep. 28, 1998

(87) PCT Pub. No.: WO97/36117
PCT Pub. Date: Oct. 2, 1997

(30) Foreign Application Priority Data

Mar. 26, 1996 (DE) .................................................. 196 11 911

(51) Int. Cl.[7] .............................. B60L 7/00; F16D 65/36; F16D 55/08
(52) U.S. Cl. ........................................... 188/162; 188/72.1
(58) Field of Search .................................... 188/71.8, 71.9, 188/72.1, 72.3, 158, 162; 303/115.2

(56) References Cited

U.S. PATENT DOCUMENTS

| | | | |
|---|---|---|---|
| 4,546,298 | * 10/1985 | Wickham et al. ................... | 188/162 |
| 4,804,073 | * 2/1989 | Taig et al. ............................ | 188/72.1 |
| 4,858,490 | * 8/1989 | Grant ..................................... | 74/661 |
| 5,090,518 | * 2/1992 | Schenk et al. ....................... | 188/72.1 |
| 5,348,123 | * 9/1994 | Takahashi et al. .................. | 188/72.1 |
| 5,829,557 | * 11/1998 | Halasy-Wimmer et al. ........ | 188/162 |
| 5,931,268 | * 8/1999 | Kingston et al. .................... | 188/72.3 |

* cited by examiner

Primary Examiner—Chris Schwartz
(74) Attorney, Agent, or Firm—Ronald E. Greigg; Edwin E. Greigg

(57) ABSTRACT

The invention relates to a braking device (10) having a spindle gear (18, 20) for actuating a friction brake (14, 16), a gear drive (30, 36) for driving the spindle gear (18, 20) and having an electric motor (40) for driving the gear drive (30, 36). For safety reasons, the invention proposes a second electric return motor (34) for releasing the friction brake (14, 16). Particularly when the two electric motors (34, 40) are connected to mutually independent power supplies, this has the advantage that the friction brake (14, 16), if one of the two electric motors (34, 40) or one of the two power supplies fails, can be released with the other electric motor (40, 34).

9 Claims, 1 Drawing Sheet

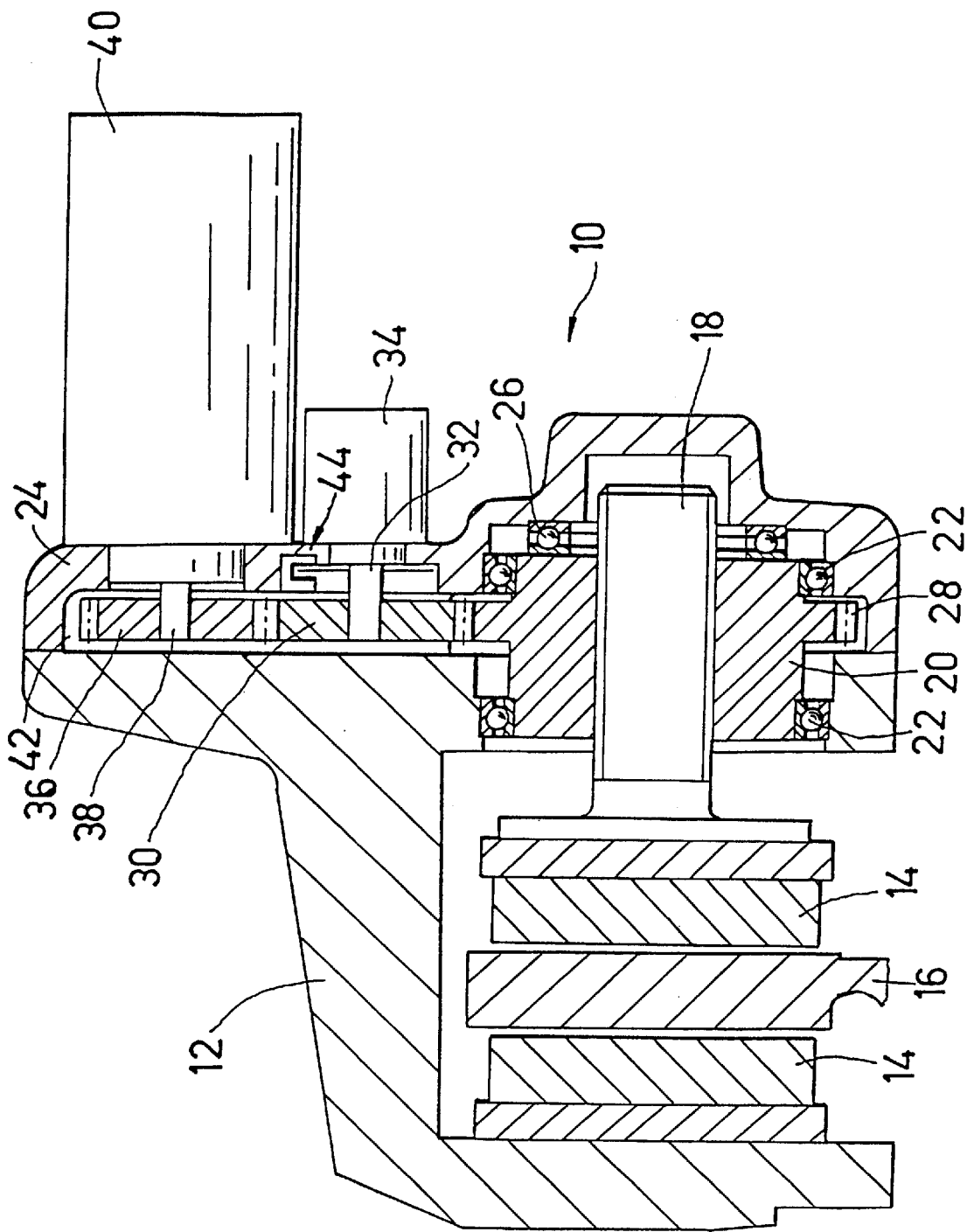

BRAKING DEVICE FOR VEHICLES

PRIOR ART

The invention relates to a braking device claims defined by the preamble to the main claim.

One such braking device is known from European Patent Disclosure EP 0 520 525 B1. The known braking device has an electric motor, which via a gear drive both actuates and again releases a friction brake. This has the disadvantage that if the electric motor or its power supply fails, the friction brake is not released or at least not completely; that is, at least a considerable residual braking force continues to act on a vehicle wheel. This results in a yawing moment, that is, a torque exerted on the vehicle about its vertical axis, which impairs the stability of the vehicle while driving.

A further factor is that the magnitude of the yawing moment depends not only on the residual braking force but also on the coefficient of friction between the vehicle wheel and the roadway and consequently varies with the condition of the roadway. When the coefficient of friction is low or there is an abrupt change in the coefficient of friction, the vehicle wheel tends to lock. If the affected vehicle wheel is a front wheel, the steerability of the vehicle is restricted. Furthermore, on cornering, a braked vehicle wheel can cause the vehicle to spin, while a blocked vehicle wheel is highly likely to cause vehicle spinning during cornering.

ADVANTAGES OF THE INVENTION

The braking device according to the invention having the haracteristics of the main claim has a second electric motor for releasing the friction brake. Especially when the two electric: motors are connected to mutually independent power supplies, this has the advantage that the friction brake can be released completely even in the event of a defect, which is intended to mean a failure of one of the two electric motors or of its power supply; in other words, a residual braking force is no longer operative, and a vehicle wheel that can be braked with the braking device of the invention can rotate freely. The steerability and driving stability of the vehicle also fully assured even in the event of a defect.

Another advantage of the invention is that in the event of a defect, at least a partial braking force can be brought to bear with the remaining electric motor; the braking device never fails completely.

The dependent claims have advantageous features and further refinements of the invention defined by the main claim as their subject.

The two electric motors can be designed in terms of their power and torque in such a way that only the first of them generates a maximum braking force, which suffices for instance to block a vehicle wheel. The second electric motor can be designed with less power, since it is needed only to release the friction brake. It is also possible for both the electric motors to be designed such that the maximum braking force can be generated with each of them (claim 3). The has the advantage that the braking device remains fully operational, even if one electric motor fails.

The two electric motors may also be designed such that each brings to bear only about half the maximum braking force (claim 4). To generate the maximum braking force, accordingly both electric motors have to be turned on. This makes it possible to reduce the necessary installation space and weight of the braking device according to the invention. Another advantage is that the friction brake in the event of a defect is still actuatable even if not with maximum braking force.

According to claim 5, the braking device of the invention has a return path sensor for ascertaining the return path of brake linings upon release of the friction brake and thus for ascertaining the gap between the brake lining and the brake disk or brake drum. The return path can thus be adjusted to a constant value, that is, a defined air clearance between the brake lining and the brake disk or brake drum, regardless of the wear of the brake linings. This has a dynamic advantage because the actuation path always remains constantly short, and because of a constantly short response time upon actuation of the friction brake until it first grips, even in the event of increasing wear of its brake linings. Furthermore, all the wheel brakes of a vehicle grip at the same time and thus, from the onset of a braking event, with uniform braking force distribution in the vehicle, even if the brake linings are worn to different extents. The vehicle is not pulled out of its lane by any one wheel brake coming into action earlier than the others. Another advantage of this embodiment of the invention is that the defined air clearance adjustment is accomplished without expensive mechanisms.

A locking gear according to claim 8, that is, a gear that allows no motion from the impingement of force or moment on its drive side but can be driven and moved only from one drive side has the advantage that the electric motors need not be supplied with electric current in order to keep the braking force constant. This also has the advantage that the braking device can be used as a non-self-releasing parking brake. A self-locking gear also offers the aforementioned advantages of a locking gear, at least to a limited extent. The term self-locking gear is meant as a gear which allows a motion from the imposition of force or moment, if the imposed force or moment exceeds a threshold value. Examples of self-locking gears are gear drives or planetary gears. Such gears increase a torque, required to turn the electric motors when they are not being supplied with electric current, toward their power takeoff by the factor of the gear reinforcement. Internal friction of the self-locking gear is a further factor; overcoming it on the power takeoff side, because of the gear reinforcement, requires greater torque than on the drive side.

DRAWING

The invention will be described in further detail below in terms of an exemplary embodiment shown in the drawing. The sole drawing figure is a section through a braking device of the invention.

DESCRIPTION OF THE EXEMPLARY EMBODIMENT

The braking device according to the invention, shown in the drawing and identified overall by reference numeral 10, has a sliding brake caliper 12 with a pair of brake linings 14 for braking a brake disk 16, only a fragment of which is shown in the drawing. For pressing the brake linings 14 against the brake disk 16, a spindle gear with a threaded spindle 18 and a spindle nut 20 is built into the brake caliper 12. The threaded spindle 18 upon brake actuation presses against one of the two brake linings 14, and a reaction force in a manner known per se presses the other brake lining 14, via the brake caliper 12, against the opposite side of the brake disk 16.

The spindle nut 20 is rotatably supported by two radial ball bearings 22 in the brake caliper 12 and in a cap 24 that is joined to the brake caliper 12 for instance by screwing. when the brake linings 14 are pressed against the brake disk 16, the spindle nut is braced against the cap 24 via an axial ball bearing 26.

The spindle nut 20 has a gear wheel ring 28 that is integral. with it, with which ring a first gear wheel 30 meshes for the purpose of rotationally driving the spindle nut 20. The first gear wheel 30 is mounted in a manner fixed against relative rotation on a shaft 32 of an electric return motor 34.

Meshing with the first gear wheel 30 is a second gear wheel 36, which is mounted in a manner fixed against relative rotation on a shaft 38 of an electric brake actuating motor 40. Both electric motors 34, 40 are flanged to the cap 24 of the brake caliper 12. The two gear wheels 30, 36 are located in a hollow chamber 42 between the cap 24 and the brake caliper 12.

In the exemplary embodiment, the shafts 32, 38 of the electric motors 34, 40 are disposed parallel to the threaded spindle 18 and are in the same plane as it is; that is, with respect to the threaded spindle 18, the actuating motor 40 is located radially outside the return motor 34. It is understood that the second gear wheel 36 of the actuating motor 40 may engage some other point of the circumference of the first gear wheel 30 of the return motor 34 or may mesh with the gear ring 28 of the spindle nut 20 at an arbitrary point on the circumference, so that the two electric motors 34, 40 are then not located in the same plane 40 as the threaded spindle 18, and the actuating motor 40 is spaced apart by a lesser distance from the threaded spindle 18. It is also possible for the two electric motors 34, 40 to drive the spindle nut 20 via a bevel gear, not shown. These provisions serve the purpose of a compact design of the braking device 10 according to the invention which in particular is adapted to a predetermined installation space.

To measure a return path of the brake linings 14, the braking device 10 has a rotary angle measuring instrument 44 on the shaft 32 of the return motor 34. With it, the total gap, that is, the so-called air clearance, between the two brake linings 14 and the brake disk 16 when the friction brake 14, 16 is released can be ascertained and adjusted. Since the shaft 32 of the return motor 34 is connected, via the first gear wheel 30, the gear ring 28 of the spindle nut 20, the spindle nut 20, and the threaded spindle 18, to the brake lining 14 that is actuated by the threaded spindle 18, the rotary angle of the shaft 32 of the return motor 34 is proportional both to a path of the brake linings 14 toward the brake disk 16 and to a return path away from the brake disk 16.

Examples for the rotary angle sensors 44 that can be considered are capacitive or optimal measuring instruments, which are known per se in manifold versions. It is advantageous to use an electronically commutated return motor 34, whose electronic commutation offers the possibility of allowing the return motor 34 to turn back again in a defined way.

The function of the braking device 10 according to the invention is as follows: To actuate the braking device 10, the actuating motor 40 is turned on and, via the second and first gear wheels 36, 30, it drives the spindle nut 20 to rotate. The spindle nut 20, via the threaded spindle 18, converts the rotary motion into a displacement motion, which presses the brake lining 14 shown on the right in the drawing against the brake disk 16. As soon as this brake lining 14 rests on the brake disk 16, the brake caliper 12, embodied as a sliding caliper, presses the brake lining 14, shown on the left in the drawing, against the other side of the brake disk 6 in a manner known per se.

For releasing the friction brake 14, 16, the return motor 34 is turned on; via the first gear wheel 30, it drives the spindle nut 20 to rotate in the opposite direction and thereby releases the friction brake 14, 16 again. With the rotary angle measuring instrument 44, the rotary angle of the return motor 34 upon release of the friction brake is ascertained; this angle is proportional to the return path of the brake linings 14. In other words, the rotary angle measuring instrument 44 forms a return path sensor for the brake linings 14. After rotation about a defined angle, which as a rule amounts to more than one revolution, the return motor 34 is turned off. As a result, a defined air clearance of approximately 0.1 mm to 0.2 mm is attained, regardless of the wear of the brake linings 14 and of the brake disk 16. A residual braking force after the release of the brake lining 10 is zero, so that with the braking device 10 released, the brake linings 14 are not worn down, the braking device 10 does not heat up further, and stability of a vehicle during driving is not impaired.

To two electric motors 34, 40 with the two gear wheels 30, 36 and the spindle gear 18, 20 form a locking gear. This means that the friction brake 14, 16 does not automatically release after shutoff of the actuating motor 40; instead, it is released only on being returned by the return motor 34 or—in the event of a defect—by the actuating motor 40. As a result, current is needed only for actuating the friction brake 14, 16, for increasing and decreasing the braking force, and for releasing the friction brake 14, 16. On braking with a constant braking force, the electric motors 34, 40 are turned off, or only the actuating motor (40) is acted upon by a low holding current. Consequently both current consumption and heating of the electric motors 34, 40 are slight.

Another advantage of the braking device of the invention is that it can be used as a parking brake: To that end, the braking device 10 is actuated with the actuating motor 40, and the current is then switched off. The braking device 10 remains actuated. No parking brake means of any kind are needed. As a locking gear, a worm gear (not shown) can for instance be considered, instead of the spindle gear 18, 20 used in the exemplary embodiment.

A self-locking gear can also be considered, instead of a locking gear. Self-locking means that the gear can be moved on its power takeoff shaft only by overcoming a certain threshold torque. Examples of self-locking gears are gear drives or planetary gears. These gears increase a torque, required for rotating the currentless electric motor, by their step-down factor at the power takeoff shaft. The internal friction of the self-locking gear is a further factor. Thus with a self-locking gear as well, a certain braking force is maintained if the electric motors are without current. The foregoing relates to a preferred exemplary embodiment of the invention, it being understood that other variants and embodiments thereof are possible within the spirit and scope of the invention, the latter being defined by the appended claims.

What is claimed is:

1. A braking device (10) for vehicles, comprising a friction brake with an actuating device (18, 20), said friction brake (14, 16) is actuated by a first electric motor (40) that activates the actuating device and a second electric motor (34) that releases the activating device via gear wheels (30 and 36), and that the first and second electric motors (34, 40) are connected to first and second mutually independent power supplies.

2. The braking device according to claim 1, in which the braking device has a return sensor (44).

3. The braking device according to claim 2, in which the second electric motor (34) is a direct current motor with a rotary angle measuring instrument (44).

4. The braking device according to claim 2, in which the second electric motor (34) is an electrically commutated motor with a rotary angle measuring instrument.

5. The braking device according to claim 1, in which the first and second electric motors (34, 40), the actuating device (18, 20) and the gear wheels (30, 36) connecting them form a self-locking gear or a locking gear (18, 20, 30, 34, 36, 40).

6. A braking device according to claim 1, in which upon release of the friction brake (14, 16), brake linings (14) are lifted, by a definable return path, away from the brake disk (16).

7. The braking device according to claim 5, in which one of the first and second electric motors (34, 40) is an electronically commutated motor with a rotary angle measuring instrument.

8. The braking device according to claim 1, in which the braking device has a self-locking gear or a locking gear (18, 20, 30, 34, 36, 40).

9. A braking device according to claim 2, in which upon release of the friction brake (14, 16), brake linings (14) are lifted, by a definable return path, away from a brake disk (16).

* * * * *